United States Patent
Choo et al.

(10) Patent No.: US 10,536,258 B2
(45) Date of Patent: Jan. 14, 2020

(54) SKEW COMPENSATION FOR MULTI-DOMAIN CLOCK GENERATION

(71) Applicant: TEXAS INSTRUMENTS INCORPORATED, Dallas, TX (US)

(72) Inventors: Hunsoo Choo, Plano, TX (US); Hamid Safiri, Plano, TX (US); Nikolaus Klemmer, Dallas, TX (US); Jaimin Mehta, Austin, TX (US); Srinadh Madhavapeddi, Dallas, TX (US); Charles Kasimer Sestok, Dallas, TX (US); Vijayavardhan Baireddy, Hyderabad (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/996,444

(22) Filed: Jun. 2, 2018

(65) Prior Publication Data
US 2019/0372747 A1    Dec. 5, 2019

(51) Int. Cl.
*H04L 7/00* (2006.01)
*G06F 1/10* (2006.01)

(52) U.S. Cl.
CPC .............. *H04L 7/0008* (2013.01); *G06F 1/10* (2013.01); *H04L 7/0016* (2013.01)

(58) Field of Classification Search
CPC ....... H04L 7/0008; H04L 7/02; H04L 7/0331; H03L 7/08; H03L 7/18; F02F 41/1408
USPC ................. 375/354, 295, 316, 344, 358
See application file for complete search history.

(56) References Cited

U.S. PATENT DOCUMENTS

| | | | | |
|---|---|---|---|---|
| 6,662,305 B1 * | 12/2003 | Salmon | ..................... | G06F 1/12 370/503 |
| 2014/0021992 A1 * | 1/2014 | Frantzeskakis | .......... | H03L 7/18 327/159 |

* cited by examiner

*Primary Examiner* — Khai Tran
(74) *Attorney, Agent, or Firm* — John R. Pessetto; Charles A. Brill; Frank D. Cimino (57) ABSTRACT

Multi-domain clock generation with skew compensation is based on free-running counters in each of the multiple clock domains. Multi-domain clock generation circuitry provides at least first and second domain clocks generated with randomization, each based on an input clock with an input clock frequency, the domain clocks having a relative clock skew that is varied over time in magnitude and direction. A first circuit in a first clock domain, configured for operation with the first domain clock, includes a first free-running counter with a pre-defined first selected roll-over count, to generate a first free-running count (N1(k)) based on the first domain clock. A second circuit in a second clock domain is configured for operation with the second domain clock, and includes a second free-running counter with a pre-defined second selected roll-over count, to generate a second free-running count (N2(k)) based on the second domain clock.

20 Claims, 5 Drawing Sheets

| AVERAGE FREQUENCY (MHz) | MAXIMUM INSTANTANEOUS FREQUENCY (MHz) | MINIMUM PERIOD (ns) | MAXIMUM PERIOD (ns) | MINIMUM DUTY-CYCLE (%) | MAXIMUM DUTY-CYCLE (%) | MINIMUM PULSE WIDTH(ns) | NUMBER OF CLOCKS IN ONE REP. |
|---|---|---|---|---|---|---|---|
| 245.76 | 296.96 | 3.367 | 4.490 | 12.5 | 16.7 | 0.56 | 8 |

SKEW COMPENSATION FOR MULTI-DOMAIN CLOCK GENERATION

BACKGROUND

Integrated circuit designs can include multiple clock domain architectures/topologies, such as for multiple cores or functional blocks/modules. Clock distribution to the multiple clock domains can be based on a global input clock generator supplying a global clock (at a global clock frequency) to individual domain clock generators.

Within each clock domain, the domain clock generator generates a domain clock based on the global clock (and the global clock frequency), with the clock domain operating synchronously with the generated domain clock. Across clock domains, the generated domain clocks can be asynchronous in phase (cycle-to-cycle aperiodic). Dedicated interfaces manage inter-domain signaling, including synchronization.

That is, these multi-domain clock architectures are locally (inter-domain) synchronous but globally (intra-domain) asynchronous. This discrepancy in phase between clock domains can be referred to as clock/timing skew, which is a difference in edge timing between clock domains that affects cross-domain signaling or timing, which can be referred to as clock domain crossing operations.

An example of a multi-domain clock architecture is a direct conversion RF transmitter/transceiver. Direct conversion RF architectures commonly use quadrature (IQ) signal conversion and digital filtering. To meet requirements on out-of-band emissions, direct conversion transmitter designs commonly use digital pre-compensation for TX analog signal chain non-linearities and IQ mismatch (mismatch/imbalance between I and Q signal paths). In particular, IQ mismatch generate an images at frequencies reflected about the LO (local oscillator) frequency, which can appear in frequency bands outside the channel reserved for the TX (direct) signal.

IQ mismatch can be compensated by digital filtering referred to as QMC (IQ mismatch compensation). QMC is used to meet spectral emissions mask requirements for out-of-band interference, such as ACLR (adjacent channel leakage ratio) and ACPR (adjacent channel power ratio).

QMC compensation filtering in the TX signal path is based on QMC filter coefficients that require updating in a QMC calibration/adaptation operation (based on a QMC calibration/adaptation algorithm). A feedback receiver (FBRX) is used to capture data required for such calibration/adaptation. The TX and FBRX units are in different clock domains.

For TX QMC calibration/adaptation, a calibration signal is transmitted from the transmitter (TX) to the feedback receiver (FBRX), across the TX/FBRX clock domains. QMC calibration/adaptation relies on accurately estimating round-trip delay between TX calibration input and FBRX output. Specifically, convergence of the QMC calibration/adaptation algorithm relies on consistent round trip delay from capture interval to capture interval, so that the TX QMC calibration/adaptation algorithm's cost function can minimize the error between the TX input signal data set and the corresponding FBRX output signal data set (i.e., cost function minimization). The TX input data and resulting FBRX output data can be captured into respective TX and FBRX capture memories in the separate clock domains.

The asynchronous TX/FBRX domain clocks exhibit clock/timing (edge) skew that can affect the accuracy of the round-trip delay estimation required for QMC calibration (a clock domain crossing operation).

While this Background in in the context of direct conversion RF, with TX and FBRX clock domains, this Patent Disclosure is more generally related to clock generation in multi-domain clock architectures/topologies.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for multi-domain clock generation with skew compensation using free-running counters. According to aspects of the Disclosure, a methodology for multi-domain clock generation with skew compensation using free-running counters includes: generating at least first and second domain clocks that are randomized, each based on an input clock with an input clock frequency, the domain clocks having a relative clock skew that is varied over time in magnitude and direction; supplying the first domain clock to a first clock domain, the first clock domain including a first free-running counter with a pre-defined first selected roll-over count, to generate a first free-running count ($N1(k)$) based on the first domain clock; and supplying the second domain clock to a second clock domain, the second clock domain including a second free-running counter with a pre-defined second selected roll-over count, to generate a second free-running count ($N2(k)$) based on the second domain clock.

According to other aspects of the Disclosure, multi-domain clock generation provides at least first and second domain clocks generated with randomization, each based on an input clock with an input clock frequency, the domain clocks having a relative clock skew that is varied over time in magnitude and direction. A first circuit in a first clock domain is configured for operation with the first domain clock, and includes a first free-running counter with a pre-defined first selected roll-over count, to generate a first free-running count ($N1(k)$) based on the first domain clock. A second circuit in a second clock domain is configured for operation with the second domain clock, and includes a second free-running counter with a pre-defined second selected roll-over count, to generate a second free-running count ($N2(k)$) based on the second domain clock.

In other aspects of the disclosure, multi-domain clock generation circuitry is implemented in a system for radio frequency (RF) communications including TX and FBRX signal chains, with TX QMC compensation, and including skew compensation for TX and FBRX clock domains. Transmit (TX) signal path circuitry is configured to receive digital TX baseband signals, and: to capture, into a TX capture memory, TX data including phase data related to the TX baseband signals, to perform QMC filtering to generate QMC pre-compensated TX baseband signals, and to generate, based on the QMC pre-compensated TX baseband signals, TX/RF signals Feedback receive (FBRX) signal path circuitry is configured to selectively receive TX/RF signals as feedback FBRX/RF signals, and: to generate, from the FBRX/RF signals, feedback digital FBRX baseband signals, and to capture, into a RX capture memory, FBRX data including phase data related to the FBRX baseband signals. QMC circuitry is configured to receive the TX baseband signals, and to perform QMC filtering to pre-compensate the TX baseband signals for quadrature mismatch. Multi-domain clock generation circuitry includes at least a TX domain clock generator to generate for the TX signal path circuitry a TX domain clock generated with randomization, and a FBRX domain clock generator to generate for the FBRX signal path circuitry a FBRX domain clock generated with randomization, each domain clock based on an input global clock with an input global clock frequency, the TX and FBRX domain clocks having a relative clock skew that is varied over time in magnitude and direction. The TX domain clock generator includes a first free-running counter with a pre-defined first selected roll-over count, to generate a first free-running count ($N1(k)$) based on the TX domain clock. The FBRX domain clock generator including a second free-running counter with a pre-defined second selected roll-over count, to generate a second free-running count ($N2(k)$) based on the FBRX domain clock.

Other aspects and features of the invention claimed in this Patent Document will be apparent to those skilled in the art from the following Disclosure.

BRIEF DESCRIPTION OF THE DRAWINGS

FIGS. 2A-2B illustrate, for the example domain dithered clock generators of FIG. 1.

FIGS. 3A-3D illustrate an example direct conversion RF TX/FBRX 200 with a multi-domain clock architecture.

DETAILED DESCRIPTION

This Description and the Drawings constitute a Disclosure for multi-domain clock generation with skew compensation using free-running counters, including describing design examples (example implementations), and illustrating various technical features and advantages.

This Disclosure uses the following nomenclature. "Multi-domain clock generation" refers to a multi-domain clock architecture with a global clock generator, and separate domain clock generators that generate domain clocks based on a global clock frequency, but asynchronous in phase (cycle-to-cycle aperiodic), resulting in clock/timing (edge) skew between domain clocks (i.e., locally synchronous but globally asynchronous). That is, the domain clock generators each generate a domain clock based on the global input clock frequency, which can be multiplied or divided (integer or fractional), and which can be randomized (such as by dithering), providing an average clock frequency based on the global clock frequency, but with a discrepancy in phase between clock domains, referred to as clock/timing skew that results in a difference in edge timing between clock domains that affects cross-domain signaling or timing, referred to as clock domain crossing operations. "Domain dithered clock generation" refers to a domain clock generated with randomization, such as dithering, so that the clock/timing skew between multi-domain clock phases is not static, but varies over time in magnitude and direction.

In brief overview, multi-domain clock generation with skew compensation is based on free-running counters in each of the multiple clock domains. Multi-domain clock generation circuitry provides at least first and second domain clocks generated with randomization, each based on an input clock with an input clock frequency, the domain clocks having a relative clock skew that is varied over time in magnitude and direction. A first circuit in a first clock domain, configured for operation with the first domain clock, includes a first free-running counter with a pre-defined first selected roll-over count, to generate a first free-running count ($N1(k)$) based on the first domain clock. A second circuit in a second clock domain is configured for operation with the second domain clock, and includes a second free-running counter with a pre-defined second selected roll-over count, to generate a second free-running count ($N2(k)$) based on the second domain clock. In an example application, multi-domain clock generation with skew compensation according to the Disclosure can be implemented in an RF system including TX and FBRX clock domains, with skew compensation used for clock domain crossing operations in connection with QMC calibration/adaptation that uses TX and FBRX data captured into TX and FBRX capture memories.

Figure 1:
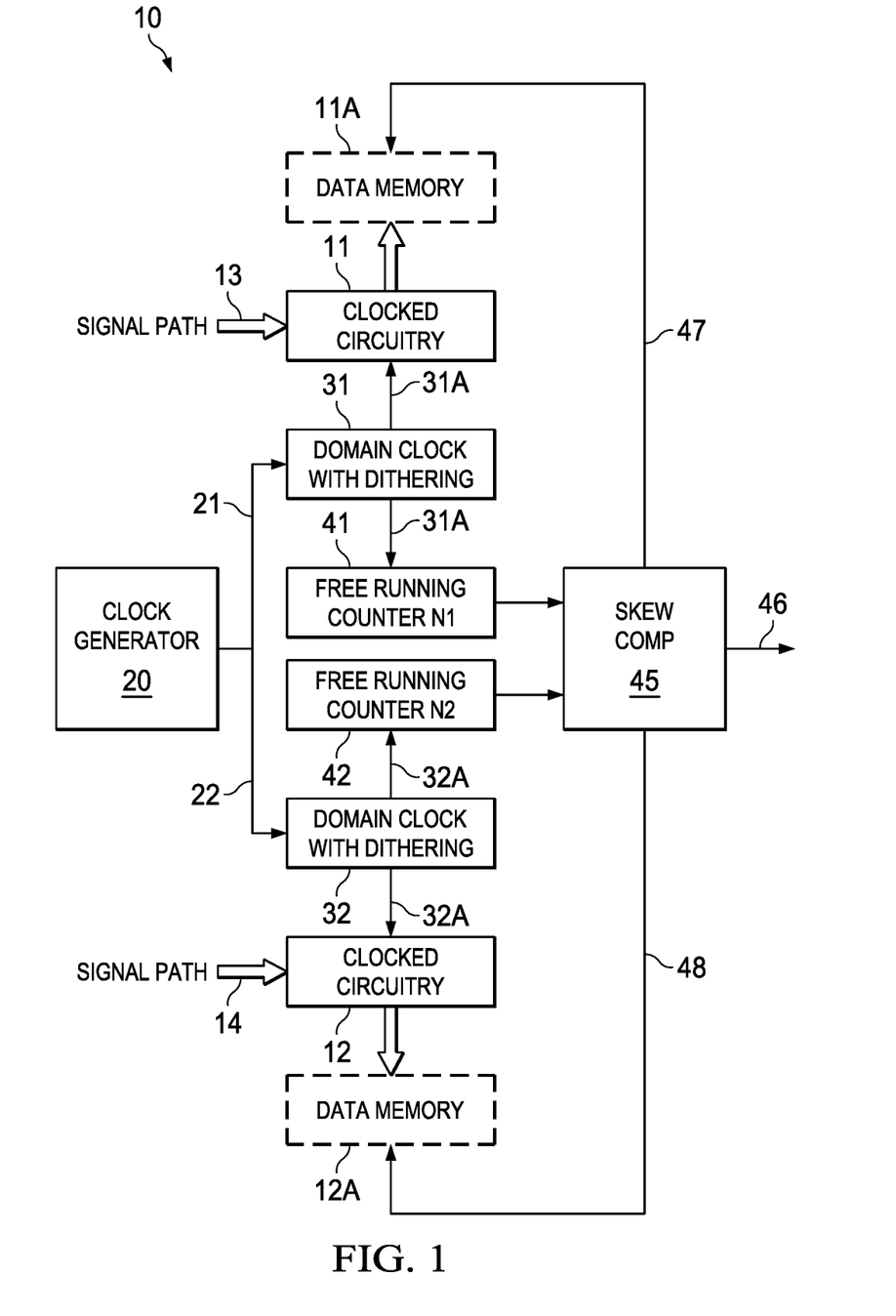
FIG. 1 illustrates an example multi-domain clock architecture 10 with multiple clock domains 11/12, including multi-domain clock generation/distribution with a global clock generator 20, and domain clock generators 31/32 generating asynchronous domain clocks with dithering/randomization 31/32, and including clock/timing skew compensation based on free running counters 41/42 in each clock domain according to the Disclosure.

FIG. 1 illustrates an example multi-domain clock architecture 10 with multiple clock domains represented by clocked circuitries 11 and 12. For this example implementation, clocked circuitry 11 includes a data memory 11A, and clocked 12 includes a data memory 12A, such as for capturing data representative of circuit operation. Clocked circuitry 11 is coupled to receive signals over signal path 13, and clocked circuitry 12 is coupled to receive signals over signal path 14.

The complete signal path for the clocked circuitries 11/12, including data memories 11A/12A, is not shown for architectural generalization and conciseness. For example, the RF TX/FBRX architecture of FIG. 3A includes TX and FBRX clock domains (clocked circuitries), where and the TX signal path includes QMC compensation, the FBRX signal path is a loopback of the RF output from the TX PA (power amplifier), and the TX/FBRX includes a QMC adaptation engine that operates with TX/RX data capture memories to provide QMC compensation data.

A multi-domain clock generation/distribution architecture includes a global clock generator 20, and multiple domain clock generators 31 and 32. Clock generation is locally synchronous, but globally asynchronous. That is, according to the Disclosure, the domain clock generators each generate a domain clock based on the global input clock frequency, which can be randomized (such as by dithering) to provide an average clock frequency based on the global clock frequency, but with clock/timing skew that affects clock domain crossing operations (cross-domain signaling or timing).

Global clock generator 20 generates a global clock, represented by clock signal lines 21/22, with a global clock frequency. Global clock generator 20 can be integrated with, or external to, an integrated circuit including clocked circuitries 11/12 and the associated domain clock generators 31 and 32.

Within the clock domains 11 and 12, domain clock generators 31 and 32 receive the global clock 21/22, and generate local domain clocks 31A and 32A based on the global clock frequency, but asynchronous in phase. The local domain clocks 31A/31A can be integer multiplied or divided, and randomized such as by dithering. The asynchronously-generated domain dithered clocks 31A/32A are distributed within the clock domains 11/12, providing local synchronization.

The domain dithered clocks 31A/32A, while locally synchronous, are asynchronous in phase across domains, exhibiting clock/timing skew between the multi-domain clock phases. This cross-domain clock/timing skew is not static, but varies over time in magnitude and direction. For example, each domain clock generator 31/32 can be configured to generate a domain clock 31A/32A at a given clock that is randomized, such as by dithering, to produce a domain clock at average frequency based on the global clock 21/22 frequency, but asynchronous in phase (cycle-to-cycle aperiodic).

According to aspects of this Disclosure, the multi-domain clock generation/distribution architecture implements clock/timing skew compensation using free running counters within the clock domains.

In clock domain 11, domain dithered clock generation includes, in addition to the domain dithered clock generator 31, a free running (N1) counter 41. In clock domain 12, domain dithered clock generation includes, in addition to the domain dithered clock generator 32, a free running (N2) counter 42.

Free running counter 41 receives the domain dithered clock 31A from the domain dithered clock generator 31 (as supplied to the clocked circuitry 11), and generates a count N1 with pre-defined (programmable) clock roll-over. Free running counter 42 receives the domain dithered clock 32A from domain dithered clock generator 32 (as supplied to the clocked circuitry 12), and generates a count N2 with a pre-defined (programmable) clock rollover. Roll-over count is programmable, and can be based on the respective clock repetition period.

Free running counters 41/42 provide the counts N1/N2 to a skew compensation block 45. For the example implementation, skew compensation block 45 can be configured to read the counts N1/N2 from the free running counters 41/42 at selected/programmable read times (such as, for the example. in connection with memory reads described below).

Skew compensation block 45 uses the N1/N2 counts from free running counters 41/42 to compensate for timing/clock skew between the domain dithered clocks 31A/32A. Skew compensation block 45 can provide skew compensation signals 46 (47/48) that can be used to correct for clock edge timing skew that can affect cross-domain signaling and/or operations.

For example, clock domain 11 can include a data memory 11A, and clock domain 12 can include a data memory 12A. Circuit operations in the clock domains 11/12 can result in capturing related data into the data memories 11A/12A that is representative of the circuit operations. Other circuit operations can be based on the data captured into the data memories 21/22, for example, to compensate/correct for clock/timing skew that affects clock domain crossing operations (i.e., affecting cross-domain signaling or timing constraints). For example, skew compensation block 45 can use the N1/N2 counts from the free running counters 41/42 to provide skew compensation signals that can be used to compensate for domain clock skew that can affect the timing of data read from the data capture memories 21/22, such as by generating read pointers 47/48 based skew compensation derived from the N1/N2 counts.

Figure 2A:
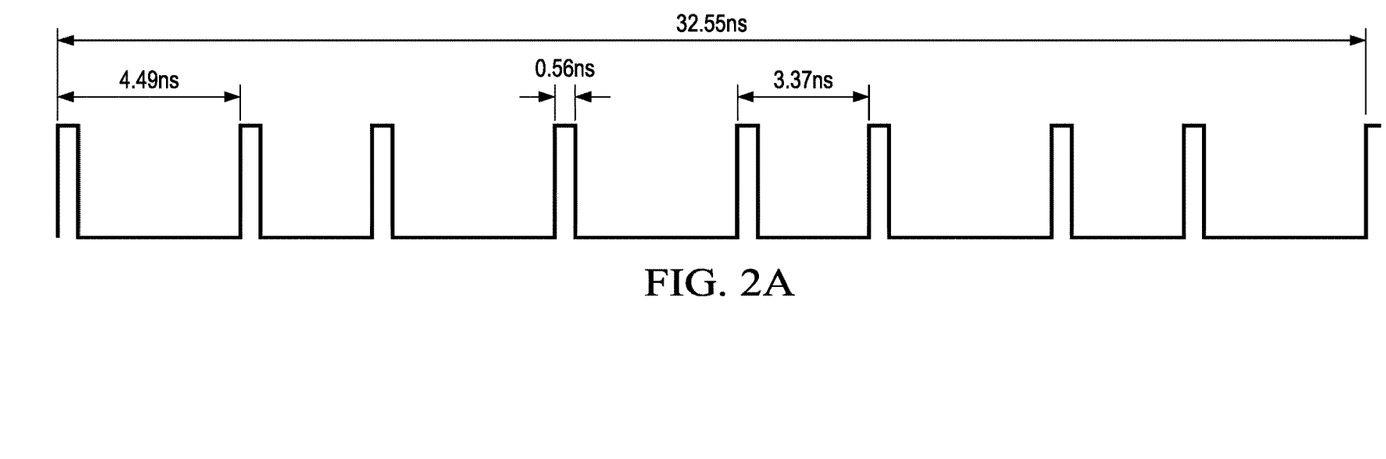
FIG. 2A illustrates example clock phase variation due to clock/timing skew between clock domains.
Figure 2B:
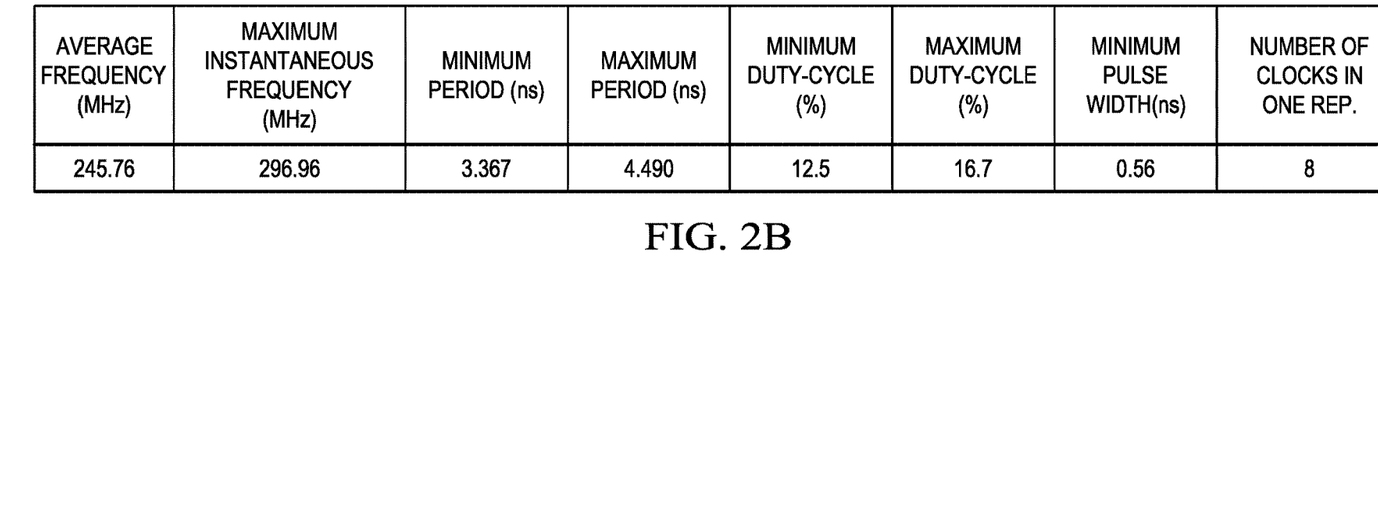
FIG. 2B illustrates corresponding example clock statistics.

FIGS. 2A-2B illustrate, for the example domain dithered clock generators of FIG. 1, example effects of clock/timing skew between clock domains.

FIG. 2A illustrates example clock phase variation due to clock/timing skew between clock domains. For purposes of clock spur suppression on the chip, clock signals are not cycle-to-cycle periodic, but average clock period is controlled accurately. As a result, instantaneous, clock phases vary from capture to capture that can affect clock domain crossing operations (such as QMC compensation described in connection with the example RF TX/FBRX architecture of FIG. 3A).

FIG. 2B illustrates a corresponding example clock pattern. The clock pattern for an example interface rate of 245.76 MHz is: 4.49 ns, 3.37 ns, 4.49 ns, 4.49 ns, 3.37 ns, 4.49 ns, 3.37 ns, 4.49 ns, and repeat.

Referring back to FIG. 1, clock skew compensation according to this Disclosure can be based on modular arithmetic performed in the skew compensation block 45, using the N1 and N2 counts read/received from the free running counters 41 and 42.

The free running counters 41/42 in the separate clock domains (clocked circuitries) 11/12 are started, and the counter values $N1(0)$ and $N2(0)$ are recorded. When a cross-domain operation is required, such as when data captured into the data memories 11A/12A is read, skew compensation block 45 also takes a snapshot of the corresponding counter values $N1(k)$ and $N2(k)$ (such as by reading the free running counters 41 and 42).

When the clock domain crossing operation is performed, such as reading the data memories 11A/12A, the instantaneous delay ambiguity is compensated based on: (a) If $[N2(k)-N1(k)]$ equals $[N2(0)-N1(0)]$, no additional delay was incurred for the specific cross-domain operation, and no skew adjustment is needed; and (b) If $[N2(k)-N1(k)]$ does not equal $[N2(0)-N1(0)]$, the skew difference $[N2(k)-N1(k)]-[N2(0)-N1(0)]$ associated with the cross-domain operation is compensated based on modular arithmetic with the roll-over count modulus. In the example cross-domain operation of reading the data capture memories 11A/12A, skew compensation block 45 can effect skew compensation by shifting the read pointers 46/47.

FIGS. 3A-D and 4 illustrate an example application RF TX/FBRX architecture adaptable for multi-domain dithered clock generation with skew compensation using free-running counters according to this Disclosure, including dithered domain clocks with skew compensation according to this Disclosure.

Figure 3A:
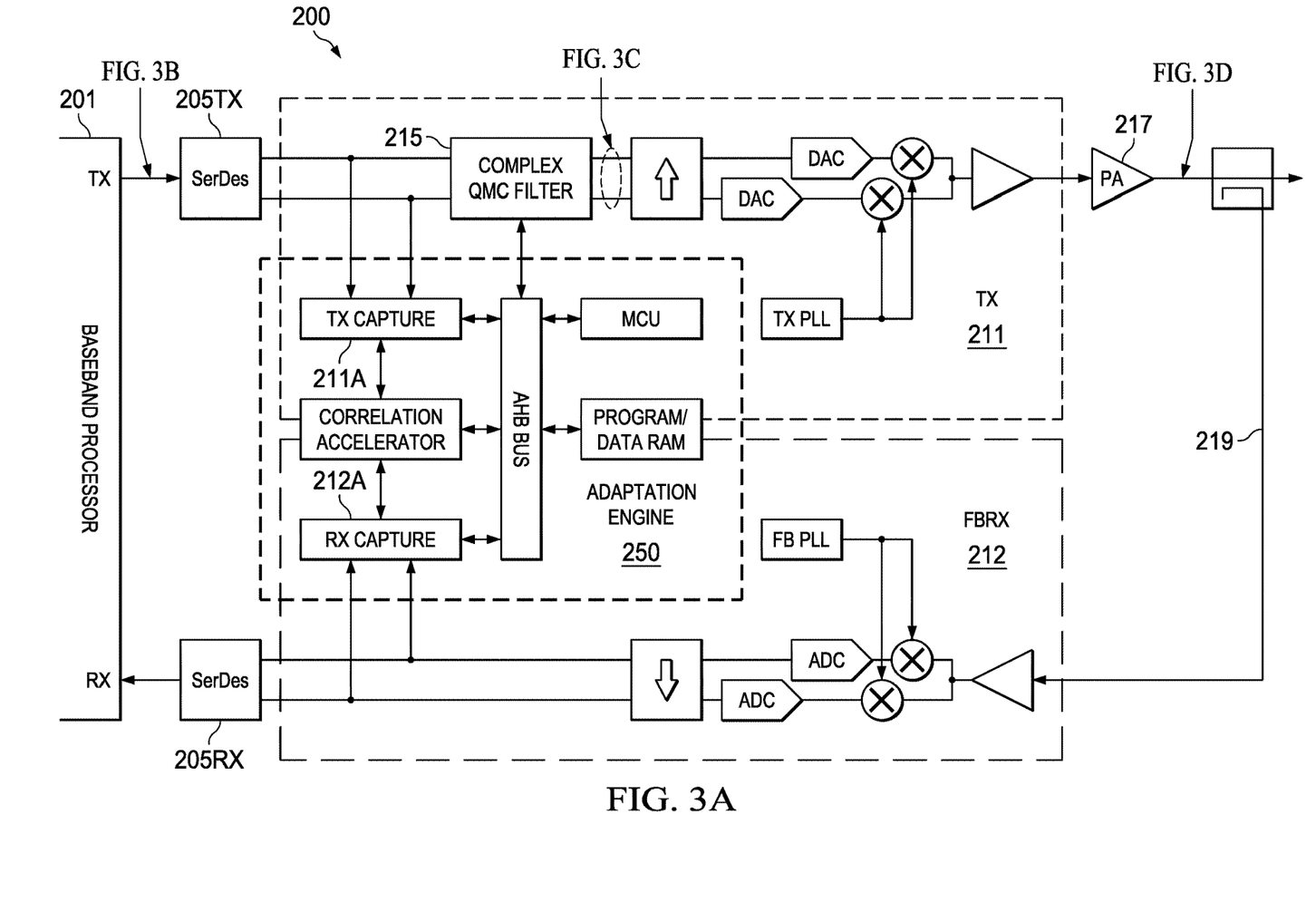
FIG. 3A illustrates the example direct conversion RF TX/FBRX 200, including TX 211 and FBRX 212 signal paths (clock domains), the TX path/domain 211 including QMC Filtering 250, the TX/FBRX 200 including an adaptation engine 260 with TX/FBRX capture memories 211A/212A for QMC calibration/adaptation, the TX/FBRX 200 configured for multi-domain clock generation according to FIG. 1, including dithered/randomized domain clocks with skew compensation according to this Disclosure (see, FIG. 4)
Figure 3B:
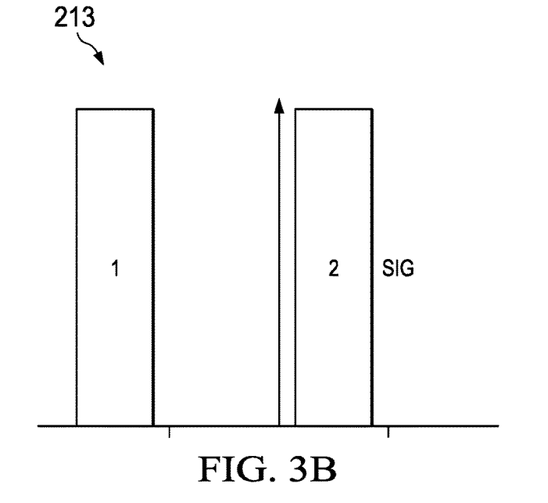
FIGS. 3B-3D illustrate example frequency domain plots for (3B) input signal, (3C) QMC filtering (image compensation), and (3D) signal output with QMC image cancellation.

FIG. 3A illustrates an example direct conversion RF TX/FBRX architecture 200, including a TX signal path 211, and a FBRX (feedback receiver) signal path 212. The TX and FBRX signal paths 211/212 include TX and FBRX digital signal chains which are clocked circuitries in separate TX and FBRX clock domains (such as in FIG. 1).

The RF TX/FBRX 200 is coupled to a digital baseband processor 201 over a SerDes (serializer/deserializer) link 205TX/205RX. The TX signal path 211 receives IQ digital baseband (signal) data (FIG. 3b, 213), which is input to a TX analog signal chain for conversion to analog (DAC), and upconversion to RF, with the TX RF signal amplified for transmission by a PA (power amplifier) 217. The RX signal path operates in a QMC calibration/adaptation mode, receiving a loopback RF QMC calibration signal from the PA, which is downconverted to baseband, converted to digital baseband data (ADC), and provided back to the baseband processor (for example, to support DPD (digital pre-distortion) in the TX baseband).

The TX and FBRX digital signal chains include data capture memories 211A (TX capture) and 212A (RX capture). The TX digital signal chain captures TX data for the TX baseband signal received from the baseband processor, including phase data, into the TX capture memory 211A. The FBRX digital signal chain captures FBRX data for the loopback FBRX baseband signal provided by the FBRX, including phase data, into the RX capture memory 212A.

Figure 3C:
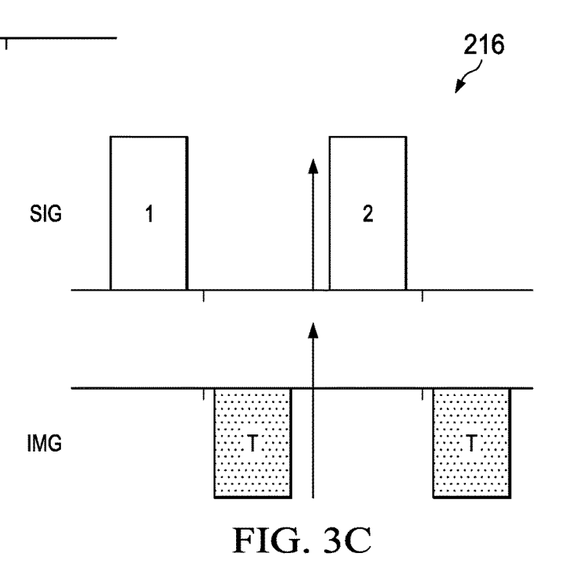
Figure 3D:
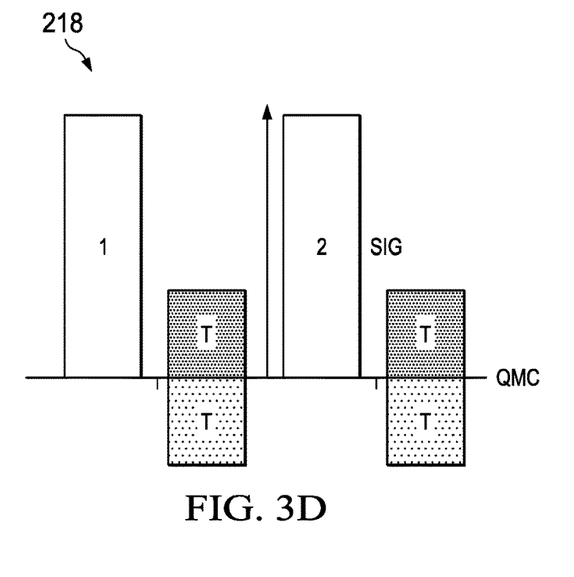

The TX signal path 211 includes, in the input digital signal chain, QMC filtering 215 to pre-compensate for quadrature mismatch (FIG. 3C, 216) in the TX analog signal chain (IQ upconversion to RF) and TX power amplification (FIG. 3D, 218). As illustrated by FIGS. 3C/3D, based on QMC pre-compensation (3C), the TX RF signal 218 is generated/transmitted in the TX analog signal chain with compensation to cancel (suppress) quadrature mismatch images (3D) at the PA TX/RF output, for example, to meet spectral emissions mask requirements for out-of-band interference (ACLR and ACPR).

The TX/FBRX architecture 200 includes a QMC adaptation engine 250, for QMC calibration/adaptation (calibrating/adapting QMC filter coefficients). A calibration signal is transmitted from the baseband processor 201 through the TX signal path 211, with loopback to the FBRX 212, across the TX/FBRX clock domains. As a clock domain crossing operation, QMC calibration/adaptation relies on accurately estimating round-trip delay between TX calibration signal input and FBRX output. Specifically, convergence of the QMC calibration/adaptation algorithm relies on consistent round trip delay from TX/FBRX capture interval to capture interval.

TX signal input data and resulting FBRX signal output data (including phase information) are captured into the TX and FBRX capture memories 211A and 212A in the TX/FBRX clock domains 211/212. The QMC adaptation engine is interfaced to the TX and FBRX capture memories.

Figure 4:
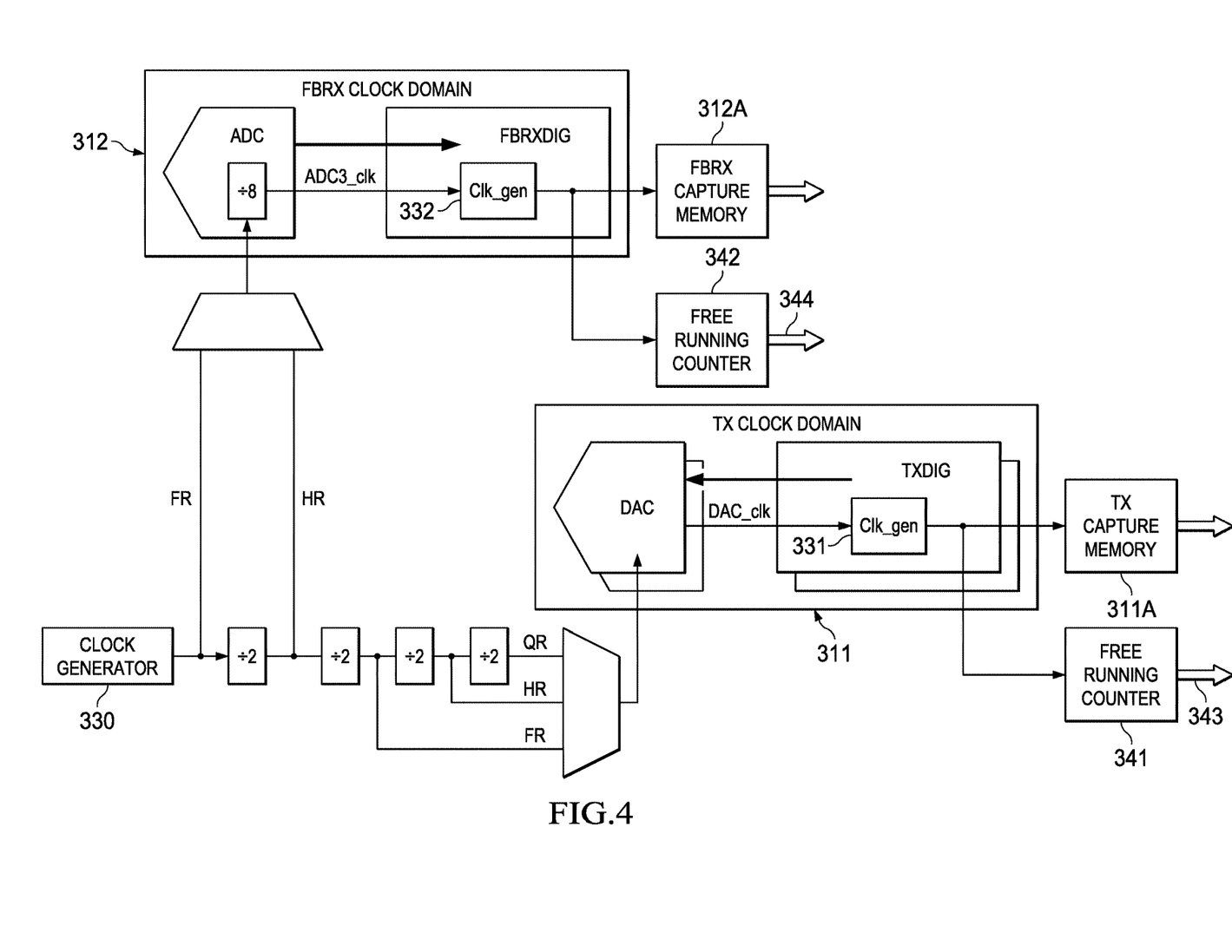
FIG. 4 illustrates the example TX/FBRX multi-domain clock architecture of FIG. 3A, adapted for the example multi-domain clock generation architecture of FIG. 1, including an input global clock generator 330 to generate a global input clock for distribution to the TX/FBRX clock domains 311/312, and including respective domain dithered/randomized clock generators 331/332 with free running counters 341/342 for skew compensation according to this Disclosure.

FIG. 4 illustrates, for the example RF TX/FBRX architecture of FIG. 3A, an example TX/FBRX multi-domain clock architecture, as described in connection with FIG. 1. An input global clock generator 330 generates a global input clock for distribution to the TX/FBRX clock domains 311/312. The TX/FBRX clock domains include domain dithered clock generators 331/332 with free running counters 341/342 for skew compensation according to the Disclosure.

As described above in connection with FIG. 1, clock skew compensation according to this Disclosure is based on modular arithmetic performed using the N1 and N2 counts read/received from the free running counters 341 and 342.

The free running counters 341/342 in the separate TX/FBRX clock domains 311/312 are started, and the counter values $N1(0)$ and $N2(0)$ are recorded. When a QMC read from the data capture memories 311A/312A (clock domain crossing operation) is required, the corresponding counter values $N1(k)$ and $N2(k)$ are retrieved 343/344 (such as by reading the free running counters 341 and 342).

When the QMC read from the data capture is performed as a clock domain crossing operation, the instantaneous TX/FBRX delay ambiguity as represented by the data captures is compensated based on: (a) If $[N2(k)-N1(k)]$ equals $[N2(0)-N1(0)]$, no additional delay was incurred for the cross-domain QMC capture memory read operation, and no skew adjustment is needed; and (b) If $[N2(k)-N1(k)]$ does not equal $[N2(0)-N1(0)]$, the skew difference $[N2(k)-N1(k)]-[N2(0)-N1(0)]$ is compensated based on modular arithmetic with the roll-over count modulus. In the example cross-domain QMC capture memory read operation, skew compensation can be effected by shifting the read pointers for the capture memories 311A/312A.

Inclusion of a free running counter per clock domain allows the detection of delay skew uncertainty between clock domain crossing operations, such as TX/FBRX data captures for QMC adaptation/compensation, and subsequent compensation/correction based on skew compensation according to this Disclosure. Cross-domain skew compensation allows compensation of TX/FBRX (clock domain crossing) delay variation due to clock phase differences, where cross-domain signaling or timing operations need to be evaluated synchronously, despite operations across clock domains that are asynchronous in clock phase. A constraint is that the domain clocks are based on the same global clock frequency, and can be traced back to a common global clock source.

The Disclosure provided by this Description and the Figures sets forth example designs and applications illustrating aspects and features of the invention, and does not limit the scope of the invention, which is defined by the claims. Known circuits, connections, functions and operations are not described in detail to avoid obscuring the principles and features of the Disclosed example designs and applications. This Disclosure can be used by ordinarily skilled artisans as a basis for modifications, substitutions and alternatives, including adaptations for other applications.

The invention claimed is:

1. A circuit including multiple clock domains, comprising clock circuitry to provide at least first and second domain clocks each domain clock based on an input clock with an input clock frequency, and each domain clock generated with randomization, the domain clocks having a relative clock skew;
a first circuit in a first clock domain is configured for operation with the first domain clock, and includes
a first free-running counter with a defined first selected roll-over count, to generate a first free-running count ($N1(k)$) based on the first domain clock; and
a second circuit in a second clock domain is configured for operation with the second domain clock, and includes
a second free-running counter with a defined second selected roll-over count, to generate a second free-running count ($N2(k)$) based on the second domain clock.

2. The circuit of claim 1, wherein:
the first and second domain clocks are randomized by dithering.

3. The circuit of claim 1, further comprising:
skew compensation circuitry operable
at a selected start time, to store first and second initial counter values (N1(0) and N2(0)) respectively for the first and second free-running counters; and
at a selected cross-domain event time associated with a cross-domain event, to read the first and second counter values N1(k) and N2(k); and
to determine a clock skew condition of the first and second domain clocks based on N1(0) and N2(0), and N1(1) and N2(1).

4. The circuit of claim 3, wherein:
for the clock skew condition, N1(k)–N2(k) is different than N1(0)–N2(0) by a defined amount.

5. The circuit of claim 3, wherein:
the first circuit includes a first memory, and the second circuit includes a second memory; and
the cross-domain event is reading data from the first and second memories.

6. The circuit of claim 5, wherein:
compensating for clock skew is accomplished by adjusting memory pointers for reading data from the first and second memories.

7. The circuit of claim 1, wherein
a frequency of at least one of the domain clocks is based on a multiplication or division of the input clock frequency.

8. A circuit including multiple clock domains for use in a system for radio frequency (RF) communications, comprising
TX (transmit) signal path circuitry to receive digital TX baseband signals, and configured
to capture, into a TX capture memory, TX data including phase data related to the TX baseband signals,
to perform QMC filtering for quadrature mismatch compensation (QMC) to generate QMC pre-compensated TX baseband signals, and
to generate, based on the QMC pre-compensated TX baseband signals, TX/RF signals;
FBRX (feedback receive) signal path circuitry, to selectively receive the QMC pre-compensated TX/RF signals as feedback FBRX/RF signals, and configured to generate, from the FBRX/RF signals, feedback digital FBRX baseband signals, and
to capture, into a RX capture memory, FBRX data including phase data related to the FBRX baseband signals;
the TX signal path circuitry including QMC circuitry to receive the TX baseband signals and perform the QMC filtering to generate the pre-compensated TX baseband signal; and
multi-domain clock generation circuitry including at least a TX domain clock generator to generate for the TX signal path circuitry a TX domain clock, and a FBRX domain clock generator to generate for the FBRX signal path circuitry a FBRX domain clock, each domain clock based on an input global clock with an input global clock frequency, and each domain clock generated with randomization, the TX and FBRX domain clocks having a relative clock skew:
the TX domain clock generator including a first free-running counter with a pre-defined first selected roll-over count, to generate a first free-running count (N1(k)) based on the TX domain clock; and
the FBRX domain clock generator including a second free-running counter with a pre-defined second selected roll-over count, to generate a second free-running count (N2(k)) based on the FBRX domain clock.

9. The circuit of claim 8, wherein:
the TX and FBRX domain clocks are randomized by dithering.

10. The circuit of claim 8, further comprising:
skew compensation circuitry operable
at a selected start time, to store first and second initial counter values (N1(0) and N2(0)) respectively for the first and second free-running counters; and
at a selected cross-domain event time associated with a cross-domain event, to read the first and second counter values N1(k) and N2(k); and
to determine a clock skew condition of the TX and FBRX domain clocks based on N1(0) and N2(0), and N1(1) and N2(1).

11. The circuit of claim 10, wherein:
for the clock skew condition, N1(k)–N2(k) is different than N1(0)–N2(0) by a defined amount.

12. The circuit of claim 10, wherein:
the TX signal path circuitry includes a first memory, and the FBRX signal path circuitry includes a second memory; and
the cross-domain event is reading data from the first and second memories.

13. The circuit of claim 12, wherein:
compensating for clock skew is accomplished by adjusting memory pointers for reading data from the first and second memories.

14. The circuit of claim 8, wherein
a frequency of at least one of the TX and FBRX domain clocks is based on a multiplication or division of the input clock frequency.

15. The circuit of claim 8, further comprising
a QMC adaptation engine coupled to the TX and FBRX memories, and configured to adapt QMC filter coefficients, which are used for QMC filtering, using the TX and FBRX data captured into the TX and FBRX capture memories.

16. A method of multi-domain clock generation useable in a system with multiple clock domains, the method comprising
generating at least first and second domain clocks, each domain clock based on an input clock with an input clock frequency, and each domain clock randomized, the domain clocks having a relative clock skew;
supplying the first domain clock to a first clock domain, the first clock domain including a first free-running counter with a defined first selected roll-over count, to generate a first free-running count (N1(k)) based on the first domain clock; and
supplying the second domain clock to a second clock domain, the second clock domain including a second free-running counter with a defined second selected roll-over count, to generate a second free-running count (N2(k)) based on the second domain clock.

17. The method of claim 16, further comprising:
at a selected start time, storing first and second initial counter values (N1(0) and N2(0)) respectively for the first and second free-running counters; and
at a selected cross-domain event time associated with a cross-domain event, reading the first and second counter values N1(k) and N2(k); and determining a clock skew condition of the first and second domain clocks based on N1(0) and N2(0), and N1(1) and N2(1).

18. The method of claim 17, wherein:
for the clock skew condition, N1($k$)–N2($k$) is different than N1(0)–N2(0) by a defined amount.

19. The method of claim 17, wherein:
the cross-domain event is reading data from a first domain data capture memory, and a second domain data capture memory.

20. The circuit of claim 19, wherein:
compensating for clock skew is accomplished by adjusting memory pointers for reading data from the first and second domain capture memories.

\* \* \* \* \*